Figures 1, 2:
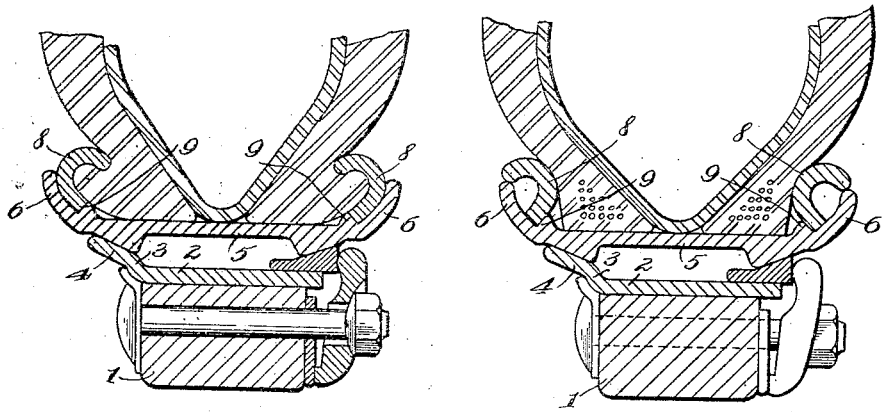

R. S. BRYANT.
RIM FOR VEHICLE WHEELS.
APPLICATION FILED OCT. 30, 1913.

1,125,055.

Patented Jan. 19, 1915.

WITNESSES:
Robert L. Bruck.
Hugh B. McGill.

INVENTOR,
Richard S. Bryant
BY Hull & Smith
ATTYS.

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,125,035.

Specification of Letters Patent.

Patented Jan. 19, 1915.

Original application filed September 2, 1913, Serial No. 787,784. Divided and this application filed October 30, 1913. Serial No. 798,175.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and has for its general object the provision of an improved form of rim whereby the removal, repair, and replacement of a pneumatic tire may be facilitated without impairing the reliability of the construction or rendering the same either ponderous or complicated.

The liability of pneumatic tires to puncture and other accidents renders it necessary that the tire be easily removable from the rim upon which it is carried and yet be securely attached to said rim under all conditions of use.

Accordingly the objects of this invention are the provision of a construction in which all of the parts can be made by cold rolling metal and without appreciably changing the thickness of any of the parts thereof; the provision of a ring of great lightness, simplicity, cheapness and ease of operation; while further objects and advantages of the invention will become apparent as the description proceeds.

Figure 3:
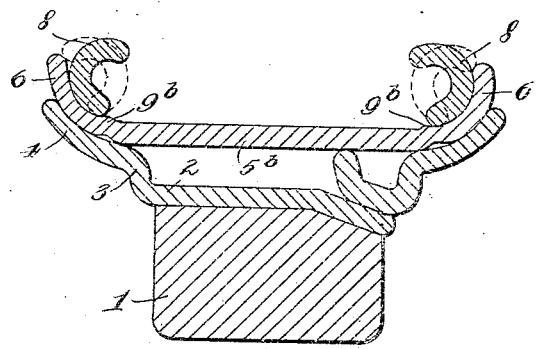
Figure 4:
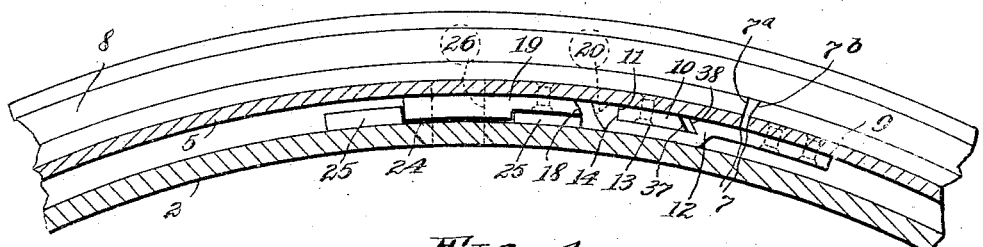

Generally speaking, my invention may be defined as consisting of the constructions and combinations illustrated in the drawings accompanying and forming part of this application, in which:

Figure 1 is a transverse, cross-sectional view of a felly, rim, and tire, the rim being constructed in accordance with my invention and the line of section passing through one of the securing bolts together with its clip which is shown in operative position; Fig. 2 is a similar view showing the same rim and felly with the rim flanges or side rings in reversed position for the reception of a tire of different type, the line of section passing at one side of the bolt and clip; Fig. 3 a transverse, cross-sectional view of a modified rim constructed in accordance with my invention; and Fig. 4 is a longitudinal, cross-sectional view of a portion of one of the foregoing rims together with its felly band, illustrating the method of securing together the ends of the middle or base ring.

Describing the parts by reference characters, 1 represents the felly of a vehicle wheel of the usual or any suitable construction and formed of wood or any other desirable material. In these drawings I have illustrated the felly as surrounded by a metallic felly band 2 having at one of its edges the outwardly turned flange 3, terminating in the outwardly flared ledge 4, the opposite edge of the felly band being plain and uninterrupted. It will be understood, however, that the particular construction of the wheel has no bearing upon this invention, wherefore the felly and felly band could be made all in one piece or either could be omitted entirely so long as a proper seating member is provided for the reception of my rim. Accordingly I have hereafter denoted these parts generally by the term "circular member."

My improved rim comprises generally a split metallic middle ring, and a pair of continuous side rings, said side rings being formed for engagement with the clenches or side walls of the tire and the split middle ring or base with the mid-portion of the tire, said middle ring being also formed with securing means whereby its abutting ends may be secured rigidly together. The middle ring comprises a cylindrical portion 5 having outwardly turned flanges 6—6 equally spaced from its median portion, the whole being bent into substantially circular form and having closely abutting ends 7. Surrounding said middle or base ring adjacent to each of the flanges 6—6 is an endless ring 8 which I here term a side ring, the same having one of its sides formed to engage the adjacent flange 6, and having its opposite side conforming to the shape of the tire to be used therewith. In the embodiment herein shown the side rings 8, 8 are convex on one side and concave on the other so that when turned with their concave sides facing each other, they will receive the ordinary clencher tire and when reversed as illustrated in Fig. 2, they will receive a straight wall tire. Also in this construction, the height of the flanges 6 and the curvature of the rings is preferably such that upon the reversal of the latter, the margins of these members will touch each other as illustrated in Fig. 2 so as both to increase the strength of the construction and to prevent the formation of a slot or groove which otherwise would collect water and sand.

In the embodiment illustrated in Figs. 1 and 2, the location of the side rings 8—8 is definitely fixed by means of annular ribs 9—9 formed upon the outer surface of the middle ring 5 adjacent to the flanges 6—6.

In the embodiment illustrated in Fig. 3, the ring 5^b is everywhere of substantially uniform thickness and made by cold rolling ordinary flat sheet steel. The portions of this ring within and adjacent to the flanges 6—6 are illustrated as swelled outwardly as at 9^b to form a substantially cylindrical shelf for the reception of the side rings. These shelves are not essential to the performance of my invention but are of practical importance in the provision of a rim in which the side flanges can be reversed, since if the side rings are forced to seat upon the cylindrical surface of the middle or base rings, they will necessarily be of too great height and too great curvature to permit of their being reversed so as to receive tires of standard shape and sizes.

One end of the base ring 5 is preferably made square as shown at 7^a in Fig. 4 and the opposite end is preferably beveled outwardly as illustrated at 7^b. Also for the purpose of sustaining the outward thrust of the wedges or wedge rings when the rim is in position upon the wheel and for the purpose of safeguarding the middle ring against accidental collapse prior to being mounted upon the rim some securing device is preferably employed for securing together the ends of this base ring. Many devices could be employed to this end and the particular type of device is entirely independent of the construction and mode of operation of the base ring and side rings.

The device illustrated in Fig. 4, which constitutes one device I may thus employ, forms the subject-matter of a separate application, filed September 2, 1913, Serial No. 787,784, out of which the present application has been divided. This illustrative device comprises a block 10 rigidly secured to the inner face of the base ring adjacent to the squared end 7^a and having an abrupt engaging shoulder 11 at the side opposite the end of the ring. Secured to the opposite end 7^b of the base ring and projecting beyond such end is a rigid metallic tongue 12 firmly secured thereto as by riveting or welding and having a notch or recess 13 adapted for the reception of the block 10, one end of the notch or recess being formed with an abutment shoulder 14 adapted to engage snugly the shoulder 11 of that block. The parts are so fashioned that when this engagement takes place only sufficient clearance is left between the ends 7^a and 7^b for purposes of convenient operation.

The forward end of the tongue is spaced from the undercut face 18 of a block 19 secured to the inner face of the base ring 5. The distance between the block 19 and the end of the tongue is such as to permit the insertion of a suitable prying tool therebetween and the end of the tongue is here shown as formed with a tool receiving recess 20 adapted for the reception of a screw driver blade or the like. The thickness of the tongue 12 at the point opposite the recess 13 is preferably such as substantially to engage the outer face of the circular member when the rim is positioned thereon thus absolutely preventing the possibility of accidental displacement. Any suitable interfitting means may be employed for preventing slipping or creeping between the rim and the felly band. In the present embodiment the block 19 is illustrated as formed with a thickened portion 24 forming a driving block and adapted to fit between fixed lugs 25—25 carried by the felly band. Also any suitable or convenient part of the rim may be formed for the reception of the valve stem; in the present embodiment the driving block 24 is apertured for the valve stem as illustrated at 26.

It will be seen that this construction secures the middle or base ring rigidly against expansion so that the proper setting up of the wedge rings will insure rigid securing of the demountable rim without reference to the degree of inflation of the tire or any variation in diameter of the side rings. In case the rim be removed from the wheel the inward pressure of the tire will of course tend to collapse the middle ring, this action however being limited by the engagement of the squared ends 7. It will be found that under the pressure of the tire it will be nearly or quite impossible to pry one of these ends over the other even in the absence of any securing means. However, if it be desired to make the device absolutely fool proof it is merely necessary to undercut the end of the block 10 as shown at 37 and similarly undercut the end of the recess 13 as shown at 38. The smallest length of the recess is greater than the greatest length of the block so that these undercut portions are normally spaced apart as shown in Fig. 4 and have no effect upon the normal operation of the device. Upon the closing of the gap between the ends 7—7 these shoulders will be forced tightly together and the middle ring locked against collapse until the deflation of the tire.

This expedient may be employed or omitted without regard to the rest of my invention, and will frequently be omitted by reason of the desirability of maintaining the ends of the base ring as close together as possible. However an overhang of the faces 37 and 38 of $\frac{1}{64}$ of an inch is ample for purposes of this safeguard.

While I have described in detail the construction which my experience indicates to be most satisfactory it will be obvious that certain of the advantages of my invention could be attained with the use of other constructions. Accordingly I do not restrict myself to the details of construction and arrangement illustrated herein except as the same are specifically recited in the claims hereto annexed or rendered necessary by the state of the prior art.

Having thus described my invention, what I claim is:—

1. In a pneumatic tired wheel, in combination, a pair of continuous side rings adapted to engage the sides of the tire, and a discontinuous, expansible base ring having a substantially cylindrical middle portion and having at each side a shelf of greater diameter than said middle portion adapted for the reception of one of said side rings, the outer portions of said shelves terminating in outturned marginal flanges arranged to engage said side rings both in direct and reversed position.

2. In a pneumatic tired wheel, in combination, an expansible base ring, outturned flanges at the sides thereof, shelves adjacent to said flanges and having a diameter greater than the diameter of the mid portion of the base ring, and endless side rings having convex outer surfaces and concave inner surfaces and adapted to surround said shelves and to contact with said flanges both in direct and reversed position.

3. In a pneumatic tired wheel, the combination, with a base ring adapted to surround a felly and to support a tire, said base ring having outturned marginal flanges, of a pair of side rings adapted to surround said base ring inside of said flanges, each of said side rings being of substantially uniform thickness at all points and being transversely curved to a substantial C shape, the shape of said flanges being such as to embrace and support said rings when the latter are disposed with their concave portions facing each other and so as to engage both margins of said rings when the same are disposed with their convex portions facing each other.

4. In a pneumatic tired wheel, the combination, with a base ring adapted to surround a felly and to support a tire, the lateral edges of said ring being formed with outturned flanges and the portion of said ring adjacent to each of said flanges being shouldered, of a pair of side rings adapted to surround said base ring inside of said flanges and to rest upon said shoulders, and means for expanding said middle ring so that said shoulders shall engage snugly with said side rings, the width of the laterally extending portion of each side ring being such that when the ring is reversed its inner and outer edges will both contact with said flange.

In testimony whereof, I hereunto affix my signature in the presence of two witnesses.

RICHARD S. BRYANT.

Witnesses:
BRENNAN B. WEST,
HAROLD E. SMITH.